United States Patent
Zagoroff

(10) Patent No.: US 6,994,390 B2
(45) Date of Patent: *Feb. 7, 2006

(54) METHOD AND APPARATUS FOR REMOTE OPENING OF A TAILGATE

(76) Inventor: Dimiter S. Zagoroff, 2 Forester Rd., P.O.Box 688, Lincoln, MA (US) 01773

( * ) Notice: Subject to any disclaimer, the term of this patent is extended or adjusted under 35 U.S.C. 154(b) by 0 days.

This patent is subject to a terminal disclaimer.

(21) Appl. No.: 10/698,969

(22) Filed: Oct. 31, 2003

(65) Prior Publication Data

US 2005/0023856 A1    Feb. 3, 2005

Related U.S. Application Data

(60) Provisional application No. 60/509,654, filed on Oct. 7, 2003, provisional application No. 60/490,883, filed on Jul. 29, 2003.

(51) Int. Cl.
*B60J 9/00* (2006.01)

(52) U.S. Cl. .................................. 296/57.1
(58) Field of Classification Search ................ 296/50, 296/52–53, 55, 57.1, 76, 146.4, 146.8; 160/152, 160/191, 192
See application file for complete search history.

(56) References Cited

U.S. PATENT DOCUMENTS

| | | | | |
|---|---|---|---|---|
| 1,638,231 A | * | 8/1927 | Archer et al. ................ 296/63 |
| 2,796,287 A | * | 6/1957 | Moyes ...................... 296/57.1 |
| 3,757,472 A | * | 9/1973 | Rogakos ........................ 49/40 |
| 4,143,904 A | * | 3/1979 | Cooper et al. .............. 296/57.1 |
| 4,585,265 A | | 4/1986 | Mader |
| 5,234,249 A | * | 8/1993 | Dorrell ..................... 296/180.1 |
| 5,358,301 A | * | 10/1994 | Konchan et al. ......... 296/146.1 |
| 5,645,310 A | * | 7/1997 | McLaughlin ............. 296/180.5 |
| 5,810,339 A | * | 9/1998 | Kuspert et al. ............. 267/293 |
| 5,851,049 A | * | 12/1998 | Squire et al. ............. 296/146.4 |
| 5,851,050 A | * | 12/1998 | Squire et al. ............. 296/146.4 |
| 5,954,383 A | * | 9/1999 | Beck et al. ................... 296/50 |
| 5,988,724 A | | 11/1999 | Wolda |
| 6,196,609 B1 | * | 3/2001 | Bowers ..................... 296/57.1 |
| 6,217,097 B1 | * | 4/2001 | Rogers et al. ............. 296/57.1 |
| 6,357,813 B1 | * | 3/2002 | Vandeberghe et al. ..... 296/57.1 |
| 6,450,559 B1 | * | 9/2002 | Renke ....................... 296/57.1 |
| 6,832,801 B2 | * | 12/2004 | Zagoroff .................... 296/57.1 |
| 6,857,679 B2 | * | 2/2005 | Zagaroff .................... 296/57.1 |

* cited by examiner

*Primary Examiner*—Dennis H. Pedder
(74) *Attorney, Agent, or Firm*—Hamilton, Brook, Smith & Reynolds, P.C.

(57) ABSTRACT

An electro-mechanical actuator for the release of a tailgate latch mechanism to open the tailgate by remote control in combination with a module that slows or stops the descent of the tailgate to prevent it from crashing down. In one embodiment the module is a pre-tensioned spring linkage with some degree of lost motion which arrests the tailgate in a partially open position. In another embodiment the module is a viscous fluid damper or a gas spring which limits the speed of travel of the tailgate. The actuator permits both manual and remote controlled opening of the tailgate is and suitable for after-market installation. Unintentional opening of the tailgate sends a warning to the operator.

11 Claims, 5 Drawing Sheets

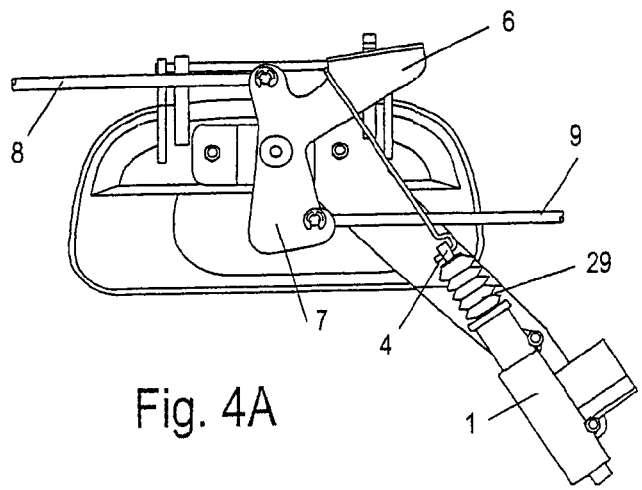
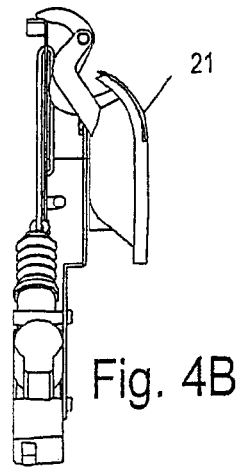
Fig. 4A  Fig. 4B
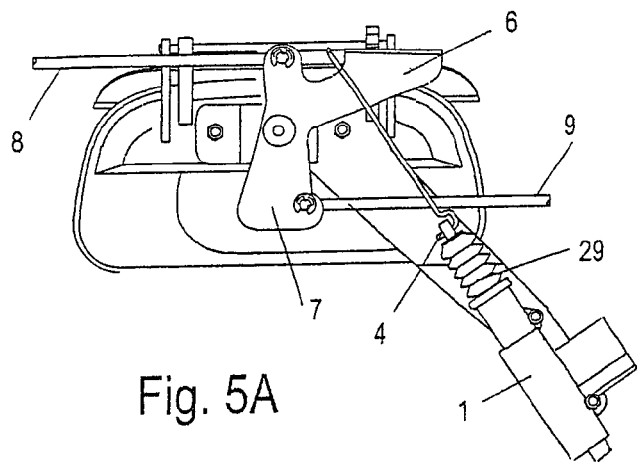
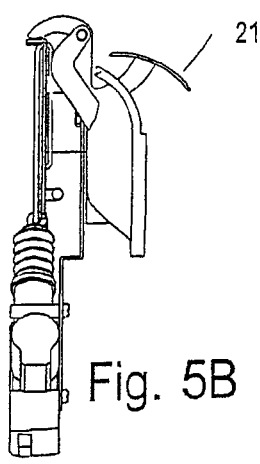
Fig. 5A  Fig. 5B
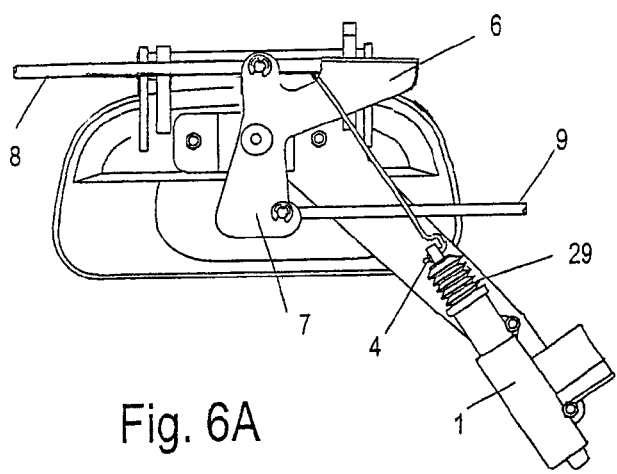
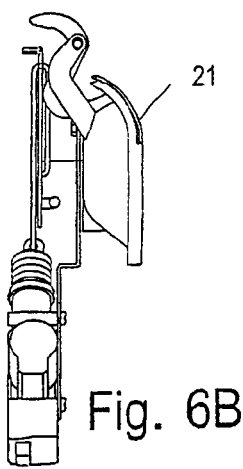
Fig. 6A  Fig. 6B

METHOD AND APPARATUS FOR REMOTE OPENING OF A TAILGATE

RELATED APPLICATIONS

This application is related to U.S. application Ser. No. 10/417,414, filed Apr. 15, 2003, now U.S. Pat. No. 6,857,679; U.S. application Ser. No. 10/121,747, filed Apr. 12, 2002, now U.S. Pat. No. 6,832,801; U.S. Provisional Application No. 60/290,817, filed May 14, 2001; U.S. Provisional Application No. 60/490,883, filed Jul. 29, 2003; and U.S. Provisional Application No. 60/509,654, filed Oct. 7, 2003, the entire teachings of which are herein incorporated by reference.

BACKGROUND OF THE INVENTION

Electro-mechanical actuators are commonly used to unlatch doors in cars that have been styled to cover up the outside door handles. In the styling trade they are known as "poppers", and their primary purpose is to achieve a sleek appearance by eliminating the outside door handles. Their application to the tailgate of a pickup truck has been limited due to the resulting crash opening of the tailgate. Unlike the doors of a car, which are hinged vertically, tailgates are hinged horizontally along the bottom edge. Once a car door is unlatched, the door merely cracks open and remains in the cracked position until it is fully opened or closed manually. Once a tailgate is unlatched however, the spring loaded latch bolts flip it out, and gravity then pulls to the fully open position. Due to the heavy weight of the tailgate, typically exceeding 50 pounds, the ensuing crash is quite violent, like a drop hammer in nature, prone to damaging the truck, and potentially lethal to any bystander, child or pet.

SUMMARY OF THE INVENTION

The present invention uses an electro-mechanical actuator, not for styling, but to open the tailgate by remote control. The crash hazard is minimized by the addition of a module that stops or slows the descent of the tailgate as described in U.S. applications Ser. Nos. 60/290,817; 10/121,747; 10/417,414, 60/490,883; and 60/509,654; (herein "Related Applications"), the entirety of which are incorporated herein by reference.

An everyday situation which highlights the advantages of the present invention occurs in attempting to load a heavy item that requires to be carried by two hands. Ordinarily, on approaching the truck, the item would have to be set down on the ground to open the tailgate, picked up from the ground again and loaded. With the present invention, the operator can open the tailgate remotely, carry the item to the truck, nudge the tailgate beyond the partially open position, and load the item without having to set it down or pick it up.

There is provided an apparatus for assisting in the remotely and safely opening a tailgate pivotally attached to a bed of a truck. The apparatus having an electro-mechanical actuator positioned inside the tailgate arranged to open tailgate latches and a module which controls a descent of the tailgate. The electro-mechanical actuator can open the tailgate latches without interfering with a manual opening of the latches. The apparatus further includes an electrical switch which sends a warning signal indicating the tailgate is ajar.

The module can include a pre-tensioned spring with lost motion that arrests the tailgate in a partially opened position or a viscous damper that slows the descent of the tailgate. The pre-tensioned spring can be a torsion rod or a spiral spring linkage on the tailgate. The viscous damper can be a gas spring.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4A shows a side view of the electro-mechanical actuator and a handle in a de-energized and a closed position.

FIG. 4B shows a rear view of the electro-mechanical actuator and the handle of FIG. 4A.

FIG. 5A shows a side view of the electro-mechanical actuator and the handle in an energized and a closed position.

FIG. 5B shows a rear view of the electro-mechanical actuator and the handle of FIG. 5A.

FIG. 6A shows a side view of the electro-mechanical actuator and the handle in a de-energized and an open position.

FIG. 6B shows rear view of the electro-mechanical actuator and the handle of FIG. 6A.

DETAILED DESCRIPTION OF THE INVENTION

Figure 1:
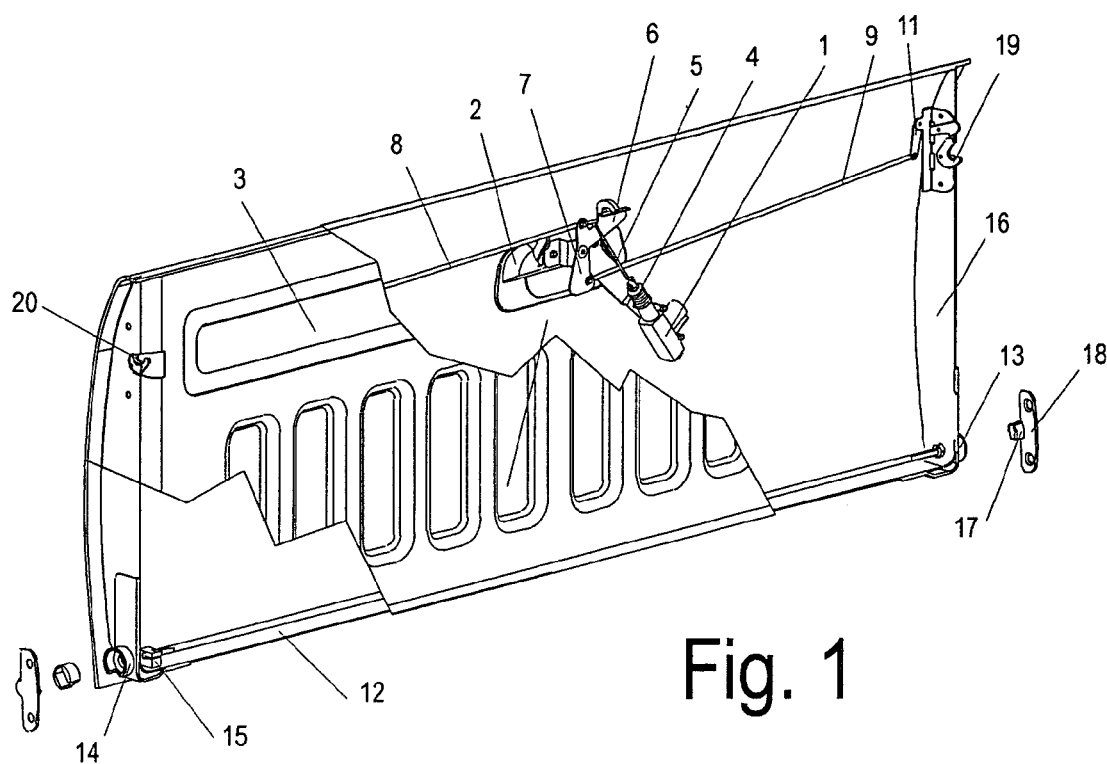
FIG. 1 is a perspective view of a tailgate in a closed position and partially broken away to show the installation of an electro-mechanical actuator and a pre-tensioned torsion rod spring inside the tailgate.

FIG. 1 shows an electro-mechanical actuator 1 mounted to a handle assembly 2 of a tailgate 3. A sliding output rod 4 of the actuator 1 is pivotally connected to a connecting rod 5 that loops over a crank arm 6 of a pitman linkage 7. Tie rods 8, 9 connect the pitman linkage 7 to door latch retaining links (not shown), 11.

FIG. 1 also shows a torsion rod spring 12 mounted in line with hinge cups 13, 14 of the tailgate 3. One end of the torsion rod 12 is rigidly clamped to the tailgate 3 with a mounting block 15. The other end of the torsion rod 12 passes through an opposite side wall 16 and mates with an elongated boss 17 of a trunnion 18. The trunnion 18 bolts rigidly to the truck body. Thus, the torsion rod spring 12 is twisted and exerts a counter balancing torque on the tailgate 3 as the tailgate 3 rotates 90 degrees from an upright to a fully open position. The degree of twist depends not only on the degree of rotation of the tailgate 3, but also on the degree of pre-stress of the torsion rod 12 and the degree of play, or lost motion, between the torsion rod 12 and the elongated boss 17 of the trunnion 18. This interrelationship and all construction features are fully described in the Related Applications.

Figure 2:
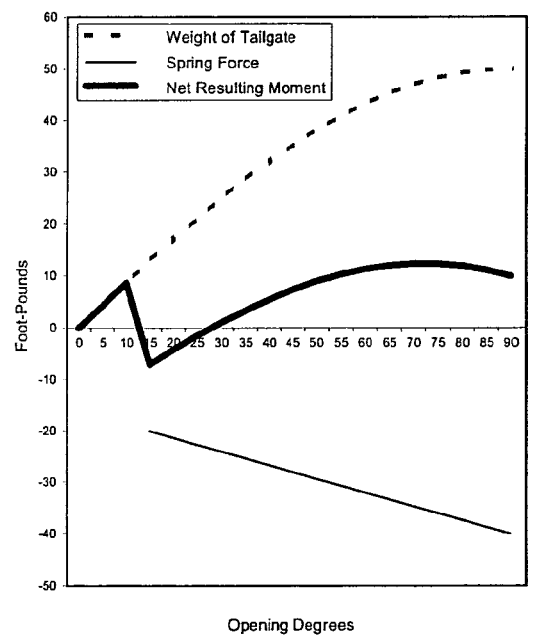
FIG. 2 is a graphical representation of the forces acting on a tailgate with and without the use of a pre-tensioned spiral or torsion rod spring and some degree of lost motion.

The salient feature of choosing the right degree of pre-stress and lost motion is the tailgate opens freely to an intermediate position, 15 degrees for example, by virtue of the lost motion of the device, at which point it comes to a stop due to the counter balance torque of the pre-stressed torsion rod spring 12. A gentle push is required to fully lower the tailgate 3. A resulting force diagram is shown in FIG. 2.

As the actuator 1 trips the latch retaining links (not shown), 11, spring loaded latch bolts 19, 20 flip open, simultaneously releasing the tailgate 3 and pushing it over the dead center upright position. Gravity then opens the tailgate 3 until the counter balance torque of the pre-stressed torsion rod spring 12 brings it to a stop, thus avoiding a free fall of the tailgate 3 and any ensuing damage.

Figure 3:
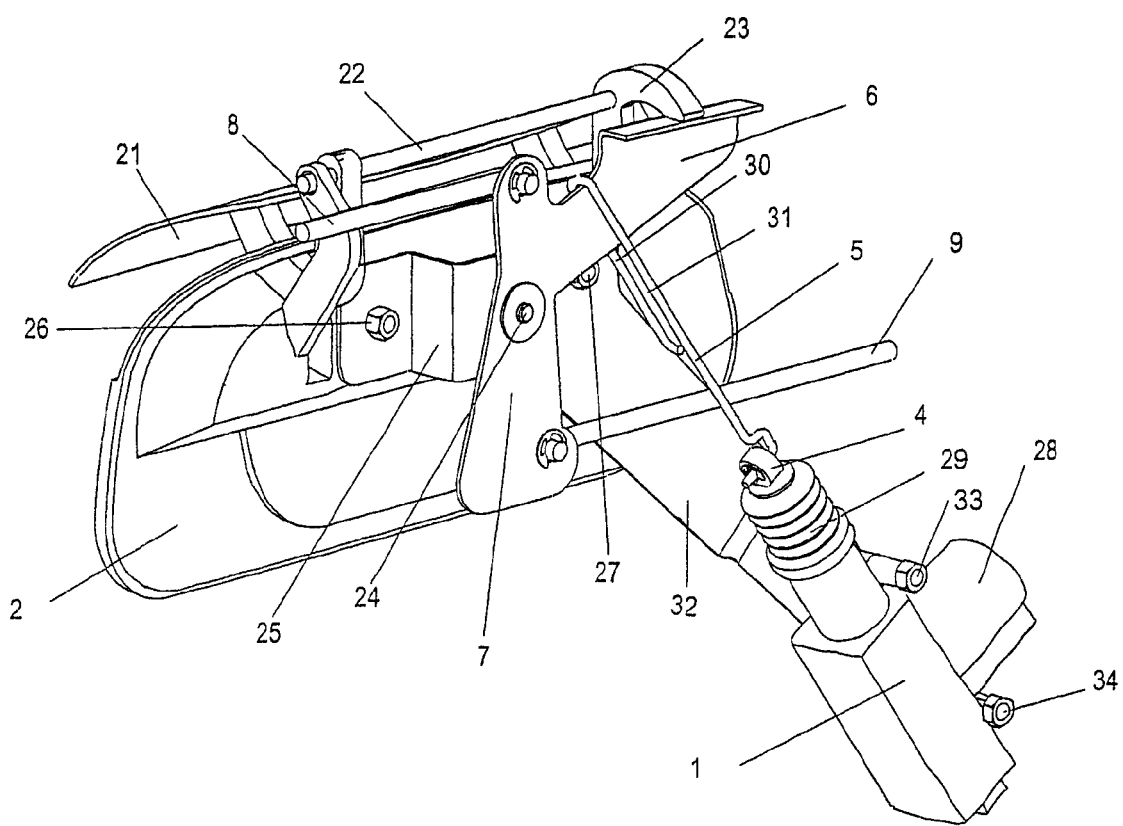
FIG. 3 is a perspective view showing the electro-mechanical actuator in greater detail.

FIG. 3 shows the actuator 1 in greater detail in relation to the handle assembly 2. The handle assembly 2 includes a handle 21 which carries a tappet 23 and pivots on an axle 22. The tappet 23 actuates the crank arm 6 of the pitman linkage 7, which in turn pivots about a rivet 24 and actuates the tie rods 8, 9. The rivet 24 is set into a pitman bracket 25 which attaches to the handle assembly 2 with fasteners 26, 27.

The actuator 1 has a motor 28 that moves the output rod 4 in a linear fashion by a rack and pinion system covered by bellows 29. The output rod 4 is pivotally connected to the connecting rod 5, which loops over the crank arm 6 of the pitman linkage 7. The connecting rod 5 has a bend back leg 30 that forms a slot 31 in which the crank arm 6 can slide with a sufficient amount of room so as to actuate the tie rods 8, 9 manually without action by the actuator 1. The actuator 1 mounts onto a bracket 32 with fasteners 33, 34. The bracket 32 can be attached to the handle mechanism over a pitman bracket 25 as an after-market accessory with a fastener 27.

The interplay between manual and remote actuation of the latch mechanism is shown as a sequence in three stages in FIGS. 4A–6B. In this sequence, the Figures marked "A" are a rear view and the Figures marked "B" are a side view.

As shown in FIGS. 4A and 4B, the handle 21 is in the closed position and the actuator 1 is de-energized with the output rod 4 and bellows 29 in an extended position. The crank arm 6 of the pitman linkage 7 is tipped up and the tie rods 8, 9 are extended.

FIGS. 5A and 5B represent a manual opening of the tailgate 3. The handle 21 is in the open position and the actuator 1 is de-energized with the output rod 4 and bellows 29 in an extended position. The crank arm 6 of the pitman linkage 7 is pushed down by the tappet 23 of the handle 21, and the tie rods 8, 9 are pulled in. The crank arm 6 slides freely through the slot 31 without disturbing the actuator 1.

FIGS. 6A and 6B represent a remote opening of the tailgate 3. The handle 21 is in the closed position and the actuator 1 is energized with the output rod 4 and bellows 29 in the contracted position. The crank arm 6 of the pitman linkage 7 is pulled down by the connecting rod 5, and the tie rods 8, 9 are pulled in.

Figure 7:
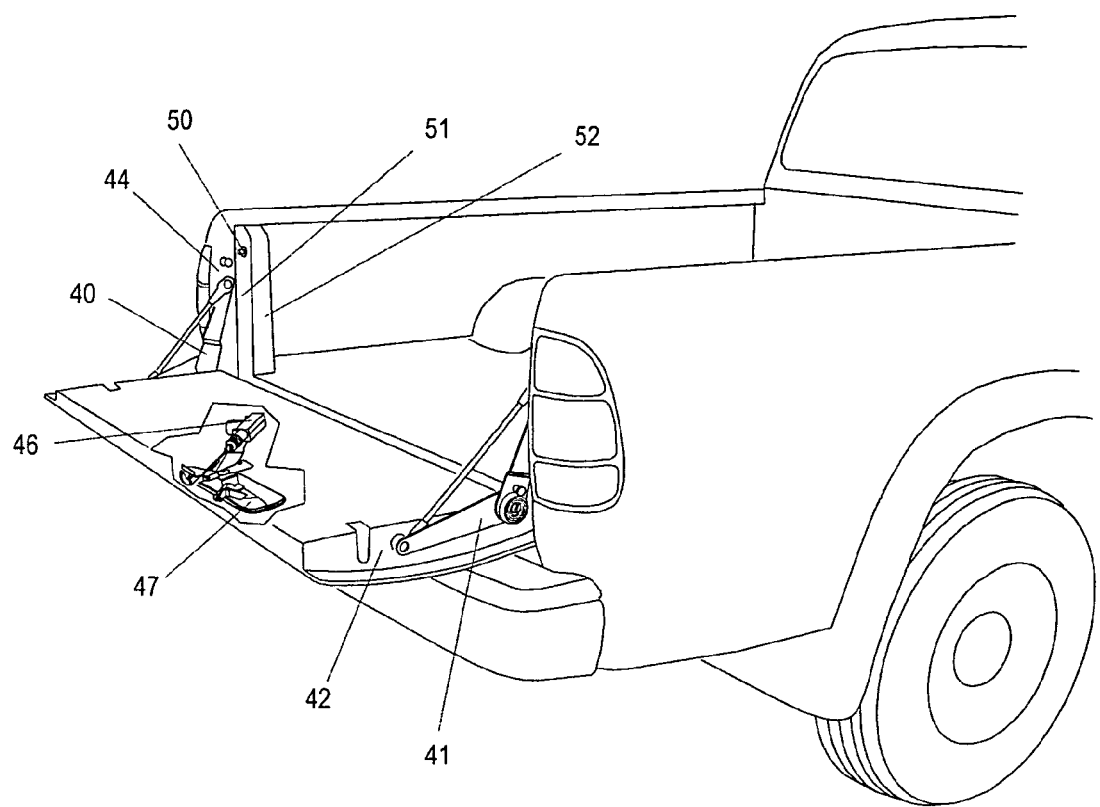
FIG. 7 is a perspective rear view of a pick-up truck with the tailgate in the open position and partially broken away to show the installation of an electro-mechanical actuator inside the tailgate and a pair of pre-tensioned spiral spring linkages mounted at the sides of the tailgate, and a push-button switch that sends a warning that the tailgate is ajar.

FIG. 7 shows a variation of the first embodiment of the present invention. A pair of spiral spring linkages 40, 41 are mounted in the gaps between the sides of the tailgate 42 (43 hidden from view) and the inside surfaces of the truck 44 (45 hidden from view). An electro-mechanical actuator 46 is mounted to a handle assembly 47 in the manner described above. The spring linkages 40, 41 utilize pre-stress and lost motion as described the Related Applications and result in a similar relationship of forces versus opening angle as shown in FIG. 2. Thus, the spiral spring linkages 40, 41 can be made to behave in the same way as the torsion spring rod 12. One difference between the two is that the spiral spring linkage 40, 41 is better suited as an after-market installation, while the torsion spring rod 23 is a more economical factory installation.

FIG. 7 also shows a push-button electrical switch 50 mounted on a rear face 51 of a pillar 52. The switch 50 illuminates a warning signal on the instrument panel to alert the operator if the tailgate is ajar.

Figure 8A:
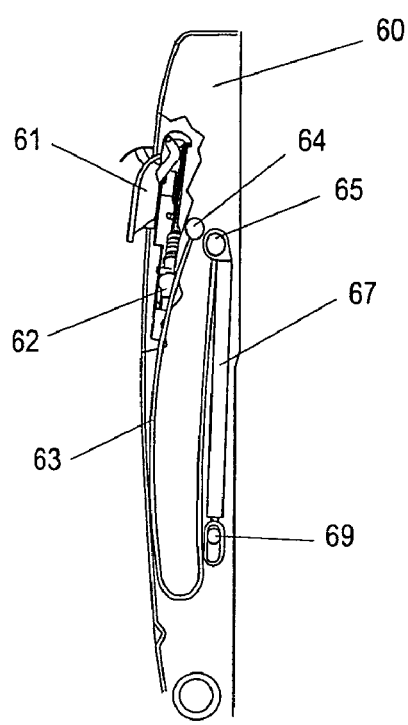
FIG. 8A shows a side view of a tailgate in the closed position with the tailgate partially broken away to show the installation of an electro-mechanical actuator and a viscous fluid damper or a gas spring.
Figure 8B:
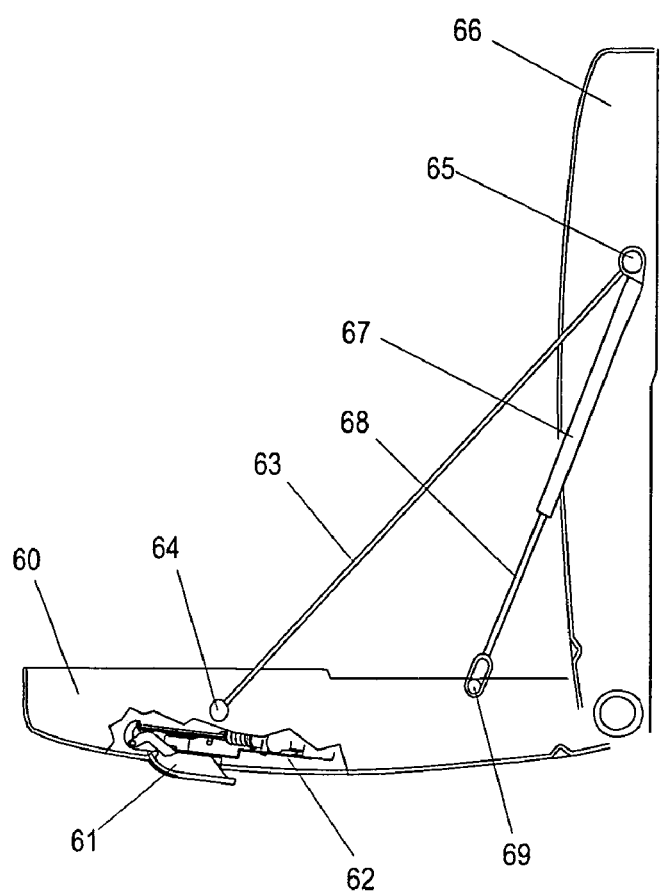
FIG. 8B shows a side view of a tailgate in the open positions with the tailgate partially broken away to show the installation of an electro-mechanical actuator and a viscous fluid damper or a gas spring.

FIGS. 8A and 8B shows the second embodiment of the present invention in a closed position and an open position using a damper. A tailgate 60 is partially cut away to reveal a handle assembly 61 and an electro-mechanical actuator 62 as described above. The tailgate 60 carries a retaining strap 63 attached pivotally with a bolt 64 to the tailgate 60 at one end, and with a snap-on fitting to a bolt 65 on a truck bed 66 in the conventional manner. Also attached to the bolt 65 is a viscous damper or gas spring cylinder 67 as described in the Related Applications. A piston 68 of the damper 67 attaches pivotally to a bolt 69 on the tailgate 60 in such a manner, that it is pulled out of the damper cylinder 67 as the tailgate 60 is opened controlling the rate of its descent.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for assisting in the remote safe opening of a tailgate pivotally attached to a bed of a truck, comprising:
   an electro-mechanical actuator positioned inside the tailgate arranged to open tailgate latches; and
   a module that controls a descent of the tailgate upon opening of the tailgate latches, wherein the module includes a spring pre-tensioned in a closed position of the tailgate and a lost motion mechanism that arrests the tailgate in a partially opened position.

2. The apparatus of claim 1, wherein the electro-mechanical actuator provides for electro-mechanical opening of the tailgate latches or manual opening of the tailgate latches.

3. The apparatus of claim 1, wherein the pre-tensioned spring is a torsion rod.

4. The apparatus of claim 1, wherein the pre-tensioned spring is a spiral wound spring.

5. The apparatus of claim 1, further comprising an electrical switch which sends a warning signal indicating the tailgate is ajar.

6. An method for assisting in the remote and safe opening of a tailgate pivotally attached to a bed of a truck, comprising:
   opening tailgate latches with an electro-mechanical actuator positioned inside the tailgate; and
   upon opening of the tailgate latches, controlling a descent of the tailgate with a module by arresting the tailgate in a partially opened position, the module including a spring pre-tensioned in a closed position of the tailgate and a lost motion mechanism.

7. The method of claim 6, wherein opening tailgate latches with an electro-mechanical actuator provides for electro-mechanical opening of the tailgate latches or manual opening of the tailgate latches.

8. The method of claim 6, wherein the pre-tensioned spring is a torsion rod.

9. The method of claim 6, wherein the pre-tensioned spring is a spiral wound spring.

10. The method of claim 6, further comprising indicating the tailgate is ajar through a warning indicator.

11. An apparatus for remotely opening a tailgate of a truck, comprising:

means for actuating tailgate latches to open the tailgate; and means for arresting the tailgate in a partially opened position, wherein the means for arresting includes a spring pre-tensioned in a closed position of the tailgate and a lost motion mechanism.

* * * * *